United States Patent

Rass

[11] Patent Number: 4,600,269
[45] Date of Patent: Jul. 15, 1986

[54] REFLECTING BADGE

[76] Inventor: Hans A. Rass, 1515 Latham, Rockford, Ill. 61103

[21] Appl. No.: 515,156

[22] Filed: Jul. 19, 1983

[51] Int. Cl.$^4$ .............................................. G02B 5/12
[52] U.S. Cl. .................................................... 350/98
[58] Field of Search ...................... 40/1.5, 1.6; 350/97, 350/98

[56] References Cited

U.S. PATENT DOCUMENTS

| 2,109,824 | 3/1938 | Johnson | 350/98 |
| 2,792,753 | 5/1957 | Drew et al. | 350/98 |
| 3,557,478 | 1/1971 | Sitzberger | 40/1.5 |
| 3,950,076 | 4/1976 | Carlson | 350/98 |
| 4,312,567 | 1/1982 | Sklair | 350/98 |

FOREIGN PATENT DOCUMENTS 29545 of 1912 United Kingdom ................. 350/98

Primary Examiner—John K. Corbin
Assistant Examiner—Vincent J. Lemmo
Attorney, Agent, or Firm—Berman, Aisenberg & Platt

[57] ABSTRACT

An article is described wherein a reflector is held within a resilient band. A retaining element is designed to be received within the band when the band is deformed. After the band has attained its normally circular configuration, the retaining element will be secured within the band. The article may be attached to a garment by placing the material of the garment over the retaining element and inserting them into the band. In a second embodiment, a retaining element is triangular and includes a clip for attaching the article, for example, to the pocket of a garment. In a further embodiment, an envelope may be attached to either the rear side of the reflector or a front side of the retainer so that articles such as currency, identification papers, may be carried by the article. The retainer has a chamfered edge and a square rear edge to facilitate assembly of the article and to cooperate with similar edges of the band.

11 Claims, 7 Drawing Figures

REFLECTING BADGE

FIELD OF THE INVENTION

This invention relates to an article which may be removably attached to flexible material. Specifically, the article is a reflector which may be attached to the clothing of a person, such as a jogger, and includes a light reflector to provide protection for the jogger.

BACKGROUND ART

It is known to provide an article attached to clothing for the purpose of reflecting light. One method of providing such an article is to simply sew a piece of reflective tape onto the article of clothing. This method has the disadvantage that the reflective material is permanently attached to the clothing. The reflective material thus cannot be easily transferred from one article of clothing to another and the article having the reflective material permanently attached must then be dedicated to a particular use of the clothing.

U.S. Pat. No. 2,254,966 (Lang) shows a button for an article of clothing wherein the button is sewed to the clothing. The outer face of the button comprises a reflective material for protecting the wearer of the clothing from accident.

It is also known to removably attach articles to materials such as clothing material. U.S. Pat. No. 1,589,158 (Hedison) shows an ornament capable of being removably attached to a stocking. A first portion of the article is designed in an ornamental shape and a second portion is a knob extending outwardly from the ornamental portion. A separate plate has a hole for receiving the knob so that when clothing material is placed over the knob, both a layer of the material and the knob may be pressed through the hole in the plate to secure the article to the material.

U.S. Pat. No. 2,472,235 (Sullivan) teaches an article for fastening various pieces of a garment together. This article comprises a disk and a ring. The relative sizes of the disk and ring are such that a flexible material may be placed over the disk and then pressed through a hole in the ring. When several layers of material are pressed through the ring in this manner, they will be effectively secured together.

SUMMARY OF THE INVENTION

As set forth above, devices such as the button shown by Lang suffer from the disadvantage that they are permanently attached to the article of clothing. It is thus not possible to easily transfer the reflective button from one jacket to another. Furthermore, the reflective button such as that shown in Lang cannot be easily removed from the garment, for example, when it is desired to launder the garment. The reflective button is thus inconvenient.

The devices shown by Hedison and Sullivan are capable of easy removal from a garment but do not permit the use of a reflective element.

Applicant's invention is an article wherein a circular, resilient band holds a reflector in such a manner that the band may be easily deformed to allow the insertion and removal of a retainer. The retainer is designed with respect to the band to permit the flexible material of a garment to be placed over the retainer so that the combination of the retainer and the garment material may be secured by the band. This retainer is placed into the band easily by applying pressure at diametrically opposed points of the band, thus deforming the band to provide a larger dimension transverse to the direction of application of pressure. After the retainer and flexible material have been placed within the band, the pressure is released, and the band assumes a circular form to secure the retainer. The band is designed with respect to the reflector so that the reflector does not become separated from the band when the band is deformed to receive the retainer.

The retainer may be either an elongated element having one dimension substantially longer than a transverse dimension, or in a second embodiment, may be triangular and include a clip. In the second embodiment, the retainer is placed within the band without the garment material, and the reflector is then attached to the garment by the clip.

Also, an envelope may be included between the retainer and the reflector for carrying items such as identification or currency.

It is an object of this invention to provide an article for removable attachment to a flexible material.

It is a further object of this invention to provide an article including a reflector which may be removably attached to an article of clothing.

It is a further object of this invention to provide a circular reflector having a circular resilient band wherein the band may be deformed to receive a retainer element for removably attaching the article to a garment.

BRIEF DESCRIPTION OF THE DRAWINGS

FIG. 7 is a side view of the clip shown in FIG. 4.

DETAILED DESCRIPTION OF THE INVENTION

Figure 1:
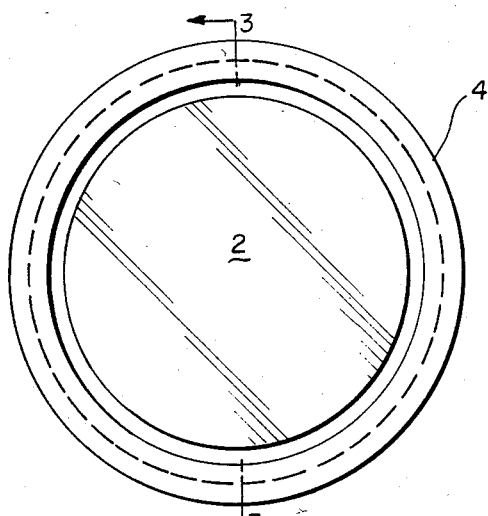
FIG. 1 is a front view of the article of the invention.

FIG. 1 shows a front view of the article according to the invention. A backing means in the form of a reflector 2 is a large, preferably plastic, reflector having a plurality of retro-reflective elements. This reflector provides safety for the wearer of the article of the invention because light from the headlights of a vehicle will be reflected and thus the operator of the vehicle will be alerted to the presence of the wearer. The reflector 2 is surrounded by a band 4. This band is normally circular, but is resilient so that when pressure is applied at spaced points, the band will be deformed.

Figure 2:
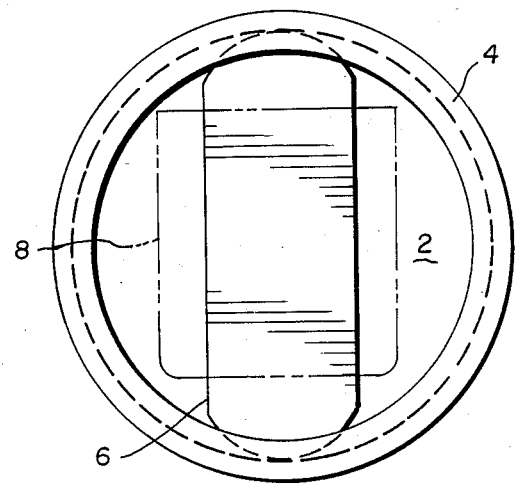
FIG. 2 is a rear view of an article according to the invention.

FIG. 2 shows a rear view of the article wherein the band 4 is in its normally circular shape. A retaining element 6 is shown placed inside of the band 4 in an operative position. Shown in phantom lines is an envelope 8, more fully shown in FIG. 5, which may be used to carry currency, identification, or the like.

Figure 3:
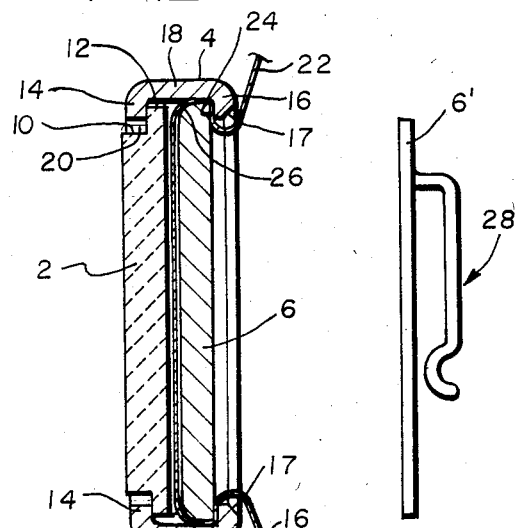
FIG. 3 is a cross section taken along a line 3—3 of FIG. 1.

FIG. 3 shows a cross section taken along a line 3—3 of FIG. 1. The reflector 2 has a stepped periphery formed by a first cylindrical surface 10 and a second, larger cylindrical surface 12. The band 4 is U-shaped in cross section and includes a first lip 14, a second lip 16, and an intermediate portion 18.

As is clearly shown in FIG. 3, the reflector 2 is secured within the band 4 because the diameter of the cylindrical surface 12 is larger than the diameter of the hole formed by the first lip 14. The first cylindrical surface 10 is smaller than the hole formed by the lip 14, thus providing a gap 20. As will become more clear in the following description, the purpose of the gap is to allow the resilient band 4 to be deformed for receiving the retaining element 6.

FIG. 3 shows the retaining element 6 received in the band 4 along with a layer 22 of a flexible garment material. The rear edge 24 of the retaining element 6 is preferably square in cross section, and the front edge 26 is rounded in cross section. This configuration allows the retainer to be placed into the band easily because of the rounded front edge 26, and yet ensures the retention of the retaining element 6 because of the square rear edge 24. The rear edge of the lip 16 is chamfered at 17 to cooperate with the rounded edge 26 during insertion of the retainer. The front edge of the lip 16 is square to cooperate with edge 24 after the retainer has been inserted.

When assembling the invention as shown in FIG. 3, a bottom portion of the retainer 6 is first placed in the band between lip 16 and reflector 2. The band 4 is then deformed by applying pressure at preferably diametrically opposed points, and the upper portion of the retainer is moved through the elongated hole formed by the lip 16 to lie next to the reflector 2. The gap 20 is preferably of such a size that the lip 14 engages surface 10 when the band 4 is deformed to receive retainer 6. The deforming pressure is then released so that the lip 16 forms a circular hole, thus securing the retaining element 6 within the U-shaped band 4.

Figure 4:
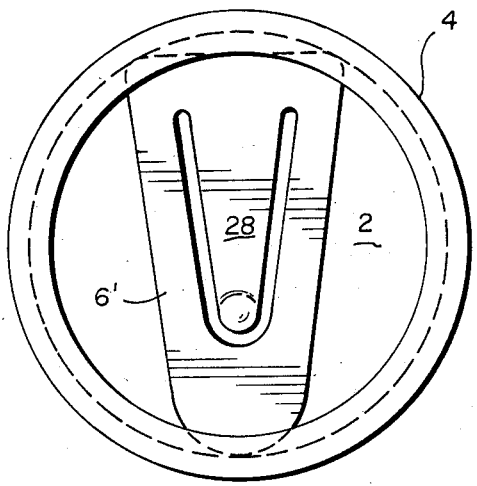
FIG. 4 is a rear view of a second embodiment of the invention.

FIG. 4 is a front view of a modified retainer 6' and FIG. 7 is a side view thereof. This retainer is triangular in outline and provides a clip element 28. In this embodiment, the retaining element 6' is secured by the band 4 without the inclusion of the garment material 22. The resilient clip 28 may then be used to attach the article to the pocket of the wearer's garment. This embodiment would be employed if it is not desired to attach the article to the material of the garment in the manner shown in FIG. 3 and yet it is still desired to attach a reflector.

Figure 5:
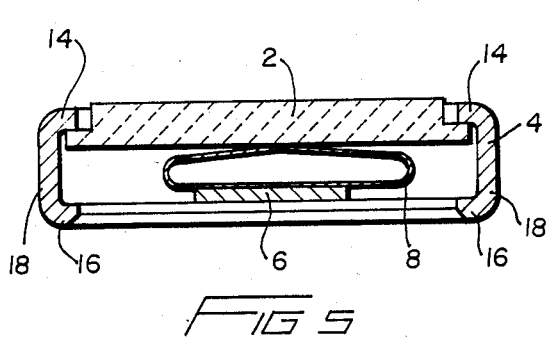
FIG. 5 is a cross section of a third embodiment of the invention.

FIG. 5 shows a view of the invention wherein an envelope 8 is placed between the retaining element 6 and the reflector 2. This envelope may be attached to either the reflector, or the retaining element 6. The garment material 22 is not shown in FIG. 5, but the material lies between the envelope 8 and the reflector 2 when the envelope is attached to the retaining element 6 and the article has been attached to a garment. On the other hand, if the envelope were attached to the reflector 2, the garment material 22 would lie between the envelope 8 and the retaining element 6.

Figure 6:
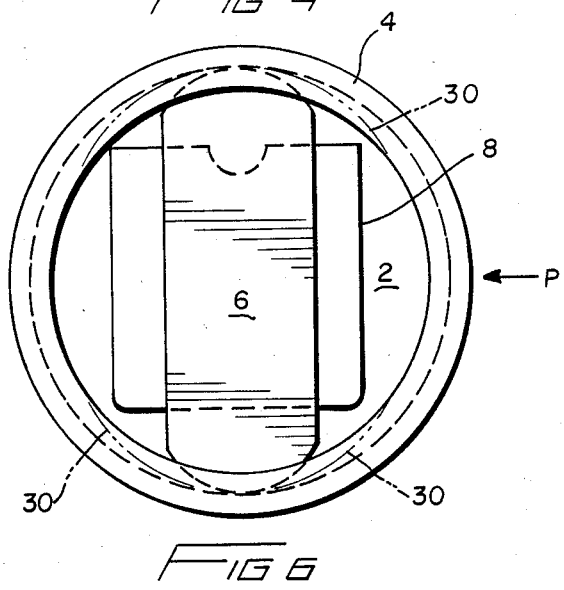
FIG. 6 is a rear view of the invention showing how the band may be deformed.

FIG. 6 shows how the band 4 is deformed for insertion of retainer 6 by application of pressure P at diametrically opposed points. Broken line 30 shows the outline of the hole formed by the lip 16 when oppositely directed pressure is applied to the band 4 at P—P. This allows the retaining element 6 to be placed within the band 4 through the elongated hole, or removed from the band. Gap 20 thus varies in thickness when the band 4 is deformed. The gap substantially vanishes at the location of application of pressure, and the lip 14 may engage surface 10 to prevent excess deformation.

It will thus be seen that a very efficient article has been described wherein a reflector may be removably attached to an article of clothing. The reflector and band have been shown circular, and this is the preferred shape to prevent the reflector from becoming disengaged from the band 4 when the band is deformed to receive the non-circular retaining element 6. It will be appreciated by those of skill in the art that a shape other than circular may be used provided the foregoing principles are followed.

It is claimed:

1. Apparatus comprising,
   retroreflective means,
   resilient band means surrounding an outer periphery of said retroreflective body means, an inner surface of said resilient band means spaced from said outer periphery when said resilient band means is in a non-deformed state, said resilient band means having a first lip extending from said inner surface to form a first opening for engaging said retroreflective means to secure said resilient band means to said retroreflective means, and retaining means for securing said resilient band means to a flexible material comprising an elongate element having a length greater than a distance between opposed locations of said lip when said resilient band means is in said non-deformed state and less than the distance between said opposed locations when said resilient band means is in a deformed state, whereby said retaining means may be inserted into said resilient band means by deforming said resilient band means and held by said lip when said resilient band means is not deformed.

2. The apparatus of claim 1 wherein said retroreflective means is circular and said relilient band means is normally circular, and wherein said band means forms a second lip spaced from said first lip and forming a second opening through which a portion of said retroreflective means extends.

3. The apparatus of claim 1 wherein said retaining means includes clip means for attaching said apparatus.

4. The apparatus of claim 2 wherein said retroreflective means includes a first cylindrical surface and a second cylindrical surface having a diameter greater than that of the first cylindrical surface and adjacent thereto, and wherein said second opening is circular and has a diameter larger than that of said first cylindrical surface and smaller than that of said second cylindrical surface.

5. The apparatus of claim 4 wherein said band means includes an intermediate portion connecting said first and second lips, said second lip forming an opening with a diameter smaller than that of said intermediate portion.

6. The apparatus of claim 5 wherein the periphery of said first cylindrical surface is spaced from said second lip when said band means is not deformed by a distance such that said second lip engages said first cylindrical surface at spaced points when said band means is deformed to allow insertion of said retaining means.

7. The apparatus of claim 6 wherein said retaining means includes a chamfered front edge and said first lip has a chamfered rear edge to cooperate with said chamfered front edge to facilitate insertion of said retaining means into said band means.

8. The apparatus of claim 6 further comprising an envelope between said retroreflective means and said retaining means for holding articles.

9. Apparatus comprising:

retroreflective means, band means surrounding an edge of said retroreflective means comprising an intermediate portion radially spaced from said edge when said band means is not deformed, a first lip extending outwardly from said intermediate portion, and a second lip extending outwardly from said intermediate portion and spaced from said first lip, whereby said band means is U-shaped in cross-section, and wherein said band means is resilient, and retaining means having a width shorter than its length, wherein said length is larger than an opening formed by said first lip when said band means is not deformed, whereby said retaining means may be inserted into said band means by applying pressure to said band means along a first line to enlarge said opening in a direction transverse to said first line.

10. The apparatus of claim 9 wherein a rear edge of said retaining means and a front edge of said first lip are substantially square and cooperate to hold said retaining means within said band means.

11. Apparatus according to claim 9 wherein said retaining means includes clip means for attaching said apparatus.

* * * * *